United States Patent [19]

Moriwaki et al.

[11] Patent Number: 5,250,604
[45] Date of Patent: Oct. 5, 1993

[54] GLASS FIBER REINFORCED POLYAMIDE COMPOSITION AND THE PROCESS FOR MANUFACTURING THE SAME

[75] Inventors: Takeshi Moriwaki; Kenji Tsutsui, both of Osaka, Japan

[73] Assignee: Kishimoto Sangyo Company Ltd., Osaka, Japan

[21] Appl. No.: 867,000

[22] Filed: Apr. 9, 1992

Related U.S. Application Data

[63] Continuation-in-part of Ser. No. 696,722, May 7, 1991, abandoned.

[30] Foreign Application Priority Data

May 7, 1990 [JP] Japan .................................. 2-127487

[51] Int. Cl.⁵ .......................... C08J 5/08; C08K 3/40; C08L 77/00
[52] U.S. Cl. .................... 524/494; 524/606; 525/432
[58] Field of Search ................. 524/494, 606; 525/432

[56] References Cited

U.S. PATENT DOCUMENTS 3,962,524 6/1976 Miyamoto et al. ................. 428/435

FOREIGN PATENT DOCUMENTS 0070001 1/1983 European Pat. Off. .

Primary Examiner—Paul R. Michl
Assistant Examiner—U. K. Rajguru
Attorney, Agent, or Firm—Koda and Androlia

[57] ABSTRACT

Polyamide composition having a high strength, high-rigidity and high impact characteristics with a smooth surface and improved in the decrease of physical properties by water absorption are made by compounding 100-250 parts by weight of glass fiber and 100 parts of weight of a mixture of 95-60 parts by weight of crystalline aliphatic polyamide, 0.2-10 parts by weight of crystalline copolyamide and 5-40 parts by weight of amorphous polyamide.

2 Claims, No Drawings

GLASS FIBER REINFORCED POLYAMIDE COMPOSITION AND THE PROCESS FOR MANUFACTURING THE SAME

This is a continuation-in-part of application Ser. No. 696,722, filed May 7, 1991, now abandoned.

BACKGROUND OF THE INVENTION

1. Field of the Invention

This invention relates to a new, glass fiber reinforced, high strength, high rigidity polyamide composition having a superior surface appearance and also to a process for manufacturing such a polyamide composition.

2. Prior Art

Crystalline aliphatic polyamide resins are widely used in the industries as mechanical parts, electric parts, and automobile parts, because it has good mechanical properties. Especially when it is compounded with glass fibers, the strength, rigidity, heat resistance and impact strength are greatly improved.

However, the performance of the glass fiber reinforced aliphatic polyamide of the prior art, namely glass fiber reinforced nylon 6 or nylon 66, have hardly developed in these fields. The result for this is that, the limit of the tensile strength specified in ASTM D638 of the glass fiber reinforced aliphatic polyamide of the prior art lies between 20 to 22 kg/mm$^2$ and the flexural modulus is 1200 kg/mm$^2$, and these values decrease to 50 to 60% at the real use condition of 23° C., 50% RH since the amide group of nylon absorbs a large amount of water to make the molecular chain soft. Thus, the materials made by the prior art are hardly acceptable to replace metal materials which are, for example, aluminum die casting alloy (JIS ADC 10) that has a tensile strength of 28.8 kg/mm$^2$, or zinc die casting alloys (JIS ZDC1, ZDC2) that have a tensile strength of 33 and 29 kg/mm$^2$, respectively. Therefore, many attempts have been made to improve the property of the prior art materials.

A polyamide resin developed for such an object includes a polyamide made by introducing aromatic hydrocarbons into the molecular chain. Such a material is so called partially aromatic polyamide comprising a component which has an aromatic ring in any one of the starting materials of conventional polyamides, diamine and dibasic acid. An example of such a polyamide is polyamide MXD-6 made by polycondensation of metaxylylene diamine and adiphic acid. The introduction of aromatic hydrocarbon into the molecular chain increases the rigidity or stiffness of the material. In addition, since the introduction of aromatic hydrocarbon reduces water absorption, the decrease of physical properties by the absorption of water is improved. However, the impact resistance is decreased since the molecular chain becomes brittle.

From the viewpoint of processing, the stiffness of the molecular chain reduces the melt flow of the material, and also retards the rate of crystallization. Therefore, it is generally required that the material must be cooled slowly to obtain higher crystalinity. However, since this molding condition for this object requires higher mold temperature as 130° C. which prolongs the molding cycle, to gradually cool down the material is extremely unfavorable for the processing. In addition, the resulting incompleteness of the crystallization makes the scattering of physical properties and the dimensions of the molded parts larger.

Since the prior art cannot produce a polyamide material which is balanced in processability, impact resistance and toughness and economical in cost, the improvement is eagerly required by the industries.

Another drawback of the prior art is the limitation of glass fiber loading. An amount of the glass fiber which is contained in the glass fiber reinforced polyamide composition is usually 45 to 70 weight parts for 100 weight parts of resin for most commercial use, and the grass fiber content is limited to 100 weight parts for 100 weight parts of resin for the uppermost filled resin.

In the higher loading of glass fiber, fiber conglomeration and poor dispersion within the matrix resin cause the transfer of force to become imperfect, and the mechanical strength and rigidity of the resin is decreased. In addition, many voids which is generated at the interface of fibers and resin cause the decrease of the strength of the material notwithstanding that the glass fiber content is increased.

Furthermore, glass fibers at the surface of the molded parts decrease the gloss and the flatness of the surface, and lower the commercial value of the molded parts; therefore, higher glass fiber loading is hardly applied to real use, and when the molded parts are painted, the rough surface absorbs the paint and a uniform surface is unattainable.

Since the mechanical properties such as tensile strength and flexural modulus are proportional to the volume ratio of the reinforcement, the composites made by the prior art can hardly replace metal parts, and the glass fiber loading level is limited to 15 to 30% by volume. As a result, the mechanical properties of the glass fiber reinforced polyamide composite remain in lower levels.

SUMMARY OF THE INVENTION

The inventors intended to develop a new polyamide composition that has a higher loading of glass fiber compared to the prior art composition. As a result, they developed such a new composition and also a manufacturing process for the new composition.

This invention comprises:

(1) Glass fiber reinforced polyamide composition comprising (A) 100 parts by weight of the mixture of (a) 95–60 parts by weight of crystalline aliphatic polyamide, (b) 5–40 parts by weight of amorphous polyamide and (c) 0.2–10 parts by weight of crystalline aliphatic copolyamide having a melting point at least 20° C. lower than that of the crystalline polyamide of (a), and (B) 100–250 parts by weight of glass fiber; and (2) A process of manufacturing glass fiber reinforced polyamide, wherein a tumble blend of:

(A) 100 parts by weight of the mixture of (a) 95–60 parts by weight of crystalline aliphatic polyamide, (b) 5–40 parts by weight of amorphous polyamide and (c) 0.2–10 parts by weight of crystalline aliphatic copolyamide having a melting point at least 20° C. lower than that of the crystalline polyamide of (a), and (B) 100–250 parts by weight of glass fiber, are injection molded by an injection molding machine equipped with a kneading mechanism.

DETAILED DESCRIPTION OF THE INVENTION

An aliphatic polyamide is a polymeric material containing an amide linkage in a main chain, and is a linear polymeric material normally obtained by a polycondensation of diamine with dibasic acid, ring-opening polymerization of lactam, or polycondensation of aminocarboxylic acid, etc. Examples of such polyamides include polyhexamethylene adipamide (nylon 6), polyhexamethylene adipamide (nylon 66), polyhexamethylene sebamide (nylon 610), polycaprolactam (nylon 6), polyundecanomide (nylon 11), polylauryllactum (nylon 12) and polytetramethylene adipamide (nylon 46), etc. Preferably the polyamide of this invention is polycaprolactam (nylon 6) and polyhexamethylene adipamide (nylon 66) in view of the availability and the price.

An amorphous polyamide used in this invention is a substantially transparent polymeric material having a molecular structure which is a combination of linear aliphatic hydrocarbon, branched aliphatic hydrocarbon, and aromatic hydrocarbon, etc. by amide linkage. The composition for such amorphous polyamides include, for example, a co-polycondensation product of hexamethylene diamine as diamine and two components of terephthalic acid and isophthalic acid as dibasic acid, or four component co-polycondensation products such as hexamethylene diamine and diamino alicyclic compound such as bis-(4-amino-cyclohexyl)-methane as diamine and terephthalic acid and isophtalic acid as dibasic acid. The bis-(4-amino-cyclohexyl)methane includes its alkyl derivatives and the chemical compounds having a similar structure such as bis-(3-methyl-4-amino-cyclohexyl)-methane, bis-(3-methyl-4-amino-cyclohexyl)-methane, 1,2-bis-(4-amino-cyclohexyl)-ethane, 2,2'-bis-4(amino-cyclohexyl)-propane, 2,2'-bis-(3-methyl-4-amino-5-ethyl-cyclohexyl)-propane, etc. However, this invention shall not be limited by the above examples. Preferably, the amorphous polyamide of this invention is the condensation product of hexamethylene diamine and the mixture of isophthalic acid and terephthalic acid (nylon 6I/6T). The amorphous polyamide does not possess a melting point, and the glass transition temperature (Tg) lies between 120°-180° C.

The effect of incorporating such an amorphous polyamide into crystalline polyamide is, as it becomes clear by the examples written later, not as a simple additive property as it is surprising that even a small amount of amorphous polyamide can remarkably improve the properties of the compound.

The cost of the amorphous polyamide is necessarily higher than a conventional crystalline polyamide such as nylon 6 or nylon 66 because of the complexity of the low materials composition. However, since the composition of this invention provides a large improvement in terms of the prevention of the decrease of physical properties by the absorption polyamide, it is extremely advantageous in view of cost performance.

The weight ratio of crystalline polyamide to amorphous polyamide to exhibit the effect lies between 95/5 to 60/40. If the ratio of amorphous polyamide is less than 5% by weight, the improvement is little, and no more improvement is attainable when more than 40% by weight of amorphous polyamide is used, because the effect is almost saturated and it is not practical because the surface of the molded parts lose the gloss.

Another necessary condition for this invention is crystalline copolyamide. Such copolyamide include nylon 6/12, nylon 6/610, nylon 66/12, nylon 6/12/610 and nylon 6/66/610/12, etc. The copolyamide have different melting points in which a melting point between 100°-200° C. is effective for this invention, and such a melting point of the copolyamide is necessary to be lower not less than 20° C. than the melting point of the crystalline aliphatic polyamide. For example, when nylon 6 is used as the aliphatic polyamide, nylon 6/12 (nylon 6/12:80/20, melting point=200° C.) or nylon 6/10 (nylon 6/610:80/20, melting point=200° C.) is preferable as the copolyamide.

By the effect of the copolyamide, a higher loading of glass fiber does not decrease the surface appearance of the molded parts, thus, a higher loading of glass fiber that cannot be made by the prior art becomes possible. In concrete terms, although the glass fiber loading is limited to 70-100 parts by weight to 100 parts by weight of resin in the prior art, this invention makes it possible to load up to 250 parts by weight of glass fiber to 100 parts by weight of resin. Although the mechanism of the action of the copolyamide is not clear, it is supposed that because the copolyamide melts at the lowest temperature among three types of nylon, which rapidly wets the surface of the glass fiber and helps uniform dispersion of the glass fiber into the molten resin matrix. The ratio of copolyamide for exhibiting such an effect lies between 0.2-20% by weight, preferably 2-10% by weight of the crystalline aliphatic polyamide. When the content is less than these ranges, the effect is not remarkable, and if the content exceeds these ranges, the effect is saturated and also the physical properties of the composite is decreased when water is absorbed.

Glass fiber reinforcement is a necessary component of this invention. Glass fiber is comprised of a glassy material called E glass, and is sold in the form of chopped strand fiber, with a fiber diameter of 5-15u and a length of 3-6 mm. Another material includes a high strength glass fiber composed of S glass. Other reinforcements include carbon graphite fiber, pottasium titanate whisker, alumina fiber, zirconium fiber, MOS ($MgSO_4 5MgO\ 8H_2O$) etc., which may be compounded together with the glass fiber. The polyamide composite referred to in this invention can incorporate stabilizers, plasticizers, mold release agents, nucleating agents, lubricants, flame retardants, etc., of the prior art to enhance the specific property required.

The method of carrying out the manufacturing of the composites referred to in this invention is that the molded parts of the composite of this invention are produced by injection molding directly from the tumble blend of resins and glass fiber. Namely, this invention can be accomplished by injection-molding a tumble blend mixture of 100 parts by weight of the mixture that comprises (i) 95-60 parts by weight of crystalline aliphatic polyamide, 5-40 parts by weight of amorphous polyamide and 0.2-20 parts by weight of crystalline copolyamide, and (ii) 100-300 parts by weight of glass fiber, and such an injection-molding is performed by an injection molding machine equipped with a kneading mechanism described below.

The process that melts and mixes the composite is accomplished by a suitable mixing and dispersing mechanism which is equipped to a screw and/or cylinder of a reciprocating screw injection molding machine. The structure for such a screw that intensifies the mixing/-dispersing mechanism for the injection molding machine used in this invention is described in Japanese Patent No. 1,104,727 and U.S. Pat. No. 4,300,840. But this invention is not limited by this process.

The compounding of the composition of this invention can be made by a usual procedure, namely, the mixture of each component is melt compounded by an extruder such as a single screw extruder, twin screw extruder, or an extruder equipped with a kneading mechanism. The resin components are mixed and compounded, and then glass fibers are tumble blended to injection mold the parts, as described above. Glass fibers can be mixed and fed with resin to produce a compound of this invention, but preferably, it is desirable to feed the resin mixture at a feed zone of the machine and to feed the glass fibers continuously into the molten resin from the inlet port installed at the down stream of the extruder to keep the length of the glass fibers longer after they are compounded, which can give the composite greater mechanical properties.

Thus, this invention provides a reinforced polyamide composition characterized in that it is superior in strength and rigidity and is also improved in the decrease of physical properties by absorption of water, which greatly exceeds the performance of glass fiber reinforced crystalline polyamide of the prior art and also surpasses the performance of metal materials such as aluminum alloy or zinc alloy for die casting. This composite is light weight and easily processable; therefore, the industrial advantage of this invention is extremely great.

In addition, the inventors have developed the process for manufacturing such a high performance composite as described above.

PREFERRED EMBODIMENTS

The following examples illustrate the composition of the present invention.
(1) Plastic materials
   Crystalline polyamide 6
      a. A28GM made by EMS-CHEMIE AG.
      b 1013B made by Ube Industries Ltd.
   Crystalline copolyamide
      c. Polyamide 6/12 (polyamide 6/12:80/20), made by conventional process.
   Amorphous polyamide
      d. G21 made by EMS-CHEMIE AG.
(2) Glass fiber
   e. 3PE-454 made by Nitto Boseki Co., Ltd.
(3) Comparative materials: Glass fiber reinforced polyamide 6
   f. 1015CG6 made by Ube Industries Ltd.

Examples 1-4, comparative examples 1-6

Crystalline polyamide and crystalline copolyamide and amorphous polyamide are mixed in a drum blender by the weight written in Table 1, and then injection molded by using a reciprocating screw injection molding machine equipped with a kneading mechanism written in Japanese Patent No. 1,104,727 and U.S. Pat. No. 4,300,840. The molding products are a set of tensile test specimen specified in ASTM D638 and flexural test specimen (12.6 mm in width, 3.2 mm in thickness and 126 mm in length) specified in ASTM D790, and injection molding were carried out at a cylinder temperature of 280° C. and a mold temperature of 80° C. In addition, comparative material f was molded by an injection molding machine (SN75 made by Niigata Engineering Co., Ltd.), equipped with a conventional screw and cylinder and using the same mold, at a cylinder temperature of 260° C. and a mold temperature of 80° C.

Tensile strength (ASTM D638), flexural strength and flexural modulus (ASTM D790), Izod impact (ASTM D256), and specific gravity (ASTM D792) were measured at as in a molded (dry) condition and after conditioned to 23° C., 50% RH by the procedure specified in ISO Standard 1110.

As a result, it was demonstrated that in the material made by the prior art technology which used only polyamide 6 (comparative examples 1, 2), the glass fiber loading was limited to 50% by weight, and when two components of polyamide 6 and amorphous polyamide are used, glass fiber loading was limited to 55% by weight of the resulting surface conditions of the molded parts, and when two components of polyamide 6 and copolyamide 6/12 are used, although the glass fiber loading can be increased to 60%, the physical properties decrease greatly by the absorption of water. In comparison with these compositions, this invention enabled the loading of glass fiber up to 70% by weight (nylon/glass fiber=30/70), therefore the resulting tensile strength of the specimens was as high as 27 kg/mm² when conditioned to 23° C., 50% RH, which exceeds those of light metals, and the flexural modulus was also increased to 2300 kg/mm² which greatly exceeded the values obtained by the prior art (Comparative material f).

As a result, all of the examples 1-4 are superior both in physical properties after conditioned and in the appearance of the molded products. Thus, it is apparent that this invention greatly improves the performance of reinforced polyamide of the prior art, and can replace the metal parts.

EFFECT OF THE INVENTION

The present invention provides a useful and cost favorable composite by compounding crystalline aliphatic polyamide and crystalline copolyamide and amorphous polyamide and glass fiber in proper ratios, resulting in accomplishing a high loading of glass fiber unattainable by the prior art. Therefore, this invention is extremely effective in that it produces a plastic material that replace the metal parts.

TABLE 1

| Items | Units | Example 1 | Example 2 | Example 3 | Example 4 |
|---|---|---|---|---|---|
| Crystalline polyamide | Grade | a | b | a | a |
|  | g | 808 | 808 | 808 | 765 |
| Crystalline copolyamide (c) | g | 42 | 42 | 42 | 85 |
| Amorphous polyamide (d) | g | 150 | 150 | 150 | 150 |
| Glass fiber (e) | g | 1500 | 1857 | 2333 | 2333 |
| Polyamide/Glass fiber |  | 40/60 | 35/65 | 30/70 | 30/70 |
| Tensile strength (As molded) | kg/mm² | 29.8 | 32.0 | 34.2 | 33.5 |
| (Conditioned) | kg/mm² | 23.5 | 25.2 | 27.5 | 26.5 |
| (As molded/Conditioned) | % | 78.9 | 78.8 | 80.4 | 79.1 |
| Flexural strength (As molded) | kg/mm² | 47.3 | 46.9 | 48.4 | 47.5 |
| (Conditioned) | kg/mm² | 37.7 | 37.0 | 38.7 | 36.3 |
| (As molded/Conditioned) | % | 79.7 | 78.9 | 80.0 | 76.4 |
| Flexural modulus (As molded) | kg/mm² | 2020 | 2300 | 2720 | 2690 |
| (Conditioned) | kg/mm² | 1770 | 2020 | 2360 | 2330 |
| (As modled/Conditioned) | % | 87.6 | 87.9 | 86.8 | 86.6 |

TABLE 1-continued

| Items | Units | Example 1 | Example 2 | Example 3 | Example 4 |
|---|---|---|---|---|---|
| Notched Izod impact (As molded) | kg · cm/cm | 20.8 | 18.2 | 18.0 | 20.2 |
| (Conditioned) | kg · cm/cm | 22.5 | 18.4 | 18.2 | 21.1 |
| (As molded/Conditioned) | % | 108.2 | 101.1 | 101.1 | 104.5 |
| Specific gravity | | 1.71 | 1.78 | 1.87 | 1.87 |
| Surface flatness | | ⊚ | ⊚ | ○ | ⊚ |
| Glass fiber dispersion | | ⊚ | ⊚ | ○ | ⊚ |
| Glass fiber show | ⊚ | ⊚ | ⊚ | ⊚ | ⊚ |

⊚: Very good
○: Acceptable for commercial use
Δ: Not acceptable for commercial use
X: Very poor

TABLE 2

| Items | Units | Comp. ex. 1 | Comp. ex. 2 | Comp. ex. 3 | Comp. ex. 4 | Comp. ex. 5 | Comp. ex. 6 |
|---|---|---|---|---|---|---|---|
| Crystalline polyamide | Grade | a | a | a | a | a | f |
| | g | 1000 | 1000 | 850 | 850 | 900 | |
| Crystalline copolyamide | g | | | | | 100 | |
| Amorphous polyamide | g | | | 150 | 150 | | |
| Glass fiber | g | 1000 | 1222 | 1222 | 1500 | 1500 | 1500 |
| Polyamide/Glass fiber | | 50/50 | 45/55 | 45/55 | 40/60 | 40/60 | 40/60 |
| Tensile strength (As molded) | kg/mm$^2$ | 23.3 | 19.4 | 27.5 | 29.2 | 28.5 | 20.4 |
| (Conditioned) | kg/mm$^2$ | 13.6 | 11.6 | 22.4 | 22.8 | 15.7 | 13.3 |
| (As molded/Conditioned) | % | 58.4 | 59.8 | 81.5 | 78.1 | 55.1 | 65.2 |
| Flexural strength (As molded) | kg/mm$^2$ | 32.5 | 30.2 | 41.8 | 45.4 | 43.3 | 16.0 |
| (Conditioned) | kg/mm$^2$ | 17.9 | 15.5 | 33.4 | 35.6 | 22.5 | 12.3 |
| (As molded/Conditioned) | % | 55.1 | 51.3 | 79.9 | 78.4 | 52.0 | 76.9 |
| Flexural modulus (As molded) | kg/mm$^2$ | 1820 | 1830 | 1760 | 2040 | 1980 | 1200 |
| (Conditioned) | kg/mm$^2$ | 1125 | 1128 | 1480 | 1760 | 1190 | 620 |
| (As molded/Conditioned) | % | 61.8 | 61.6 | 84.1 | 86.3 | 60.1 | 51.7 |
| Notched Izod impact (As molded) | kg · cm/cm | 12.5 | 8.6 | 21.0 | 21.5 | 19.2 | 15.0 |
| (Conditioned) | kg · cm/cm | 18.6 | 10.2 | 22.1 | 22.7 | 25.4 | 25.0 |
| (As molded/Conditioned) | % | 148.8 | 118.6 | 105.2 | 105.6 | 132.3 | 166.7 |
| Specific gravity | | 1.57 | 1.57 | 1.62 | 1.71 | 1.72 | 1.50 |
| Surface flatness | | Δ | X | Δ | X | ○ | ⊚ |
| Glass fiber dispersion | | Δ | X | ⊚ | X | ○ | ⊚ |
| Glass fiber show | | X | X | ○ | X | ⊚ | ○ |

⊚: Very good
○: Acceptable for commercial use
Δ: Not acceptable for commercial use
X: Very poor

What is claimed is:

1. Glass fiber reinforced polyamide composition comprising:
   (A) 100 parts by weight of the mixture of (a) 95–60 parts by weight of crystalline aliphatic polyamide, (b) 5–40 parts by weight of amorphous polyamide and (c) 0.2–10 parts by weight of crystalline aliphatic copolyamide having a melting point at least 20° C. lower than that of the crystalline polyamide of (a), and
   (B) 100–250 parts by weight of glass fiber.

2. A process of manufacturing fiber reinforced polyamide wherein a tumble blend of:
   (A) 100 parts by weight of the mixture of (a) 95–60 parts by weight of crystalline aliphatic polyamide, (b) 5–40 parts by weight of amorphous polyamide and (c) 0.2–10 parts by weight of crystalline aliphatic copolyamide having a melting point at least 20° C. lower than that of the crystalline polyamide of (a), and
   (B) 100–250 parts by weight of glass fiber, are injection-molded by an injection molding machine equipped with a kneading mechanism.

* * * * *